United States Patent [19]

Horiuchi et al.

[11] Patent Number: 4,903,588

[45] Date of Patent: Feb. 27, 1990

[54] BREAD BAKING APPARATUS

[75] Inventors: Nobuhide Horiuchi, Iwakura; Motoya Sakakibara, Aichi; Kazuo Kitamura, Nagoya, all of Japan

[73] Assignee: Kabushiki Kaisha Toshiba, Kawasaki, Japan

[21] Appl. No.: 357,252

[22] Filed: May 26, 1989

[30] Foreign Application Priority Data

Sep. 5, 1988 [JP] Japan .................................. 63-221896
Oct. 19, 1988 [JP] Japan .................................. 63-261313

[51] Int. Cl.⁴ ............................................. A47J 27/00
[52] U.S. Cl. ......................................... 99/348; 99/344; 99/468; 366/98; 366/146
[58] Field of Search ............... 99/331, 344, 348, 352, 99/353, 467, 468, 470, 473–476, 483, 484; 366/98, 69, 144, 145, 146, 149, 341; 426/27

[56] References Cited

U.S. PATENT DOCUMENTS

| | | | |
|---|---|---|---|
| 4,202,258 | 5/1980 | Masuda et al. | 99/348 |
| 4,747,696 | 5/1988 | McCrory et al. | 366/307 |
| 4,762,057 | 8/1988 | Hirota et al. | 366/98 |
| 4,776,265 | 10/1988 | Ojima | 99/468 |
| 4,836,683 | 6/1989 | Aoyama | 99/348 |
| 4,844,048 | 7/1989 | Aruga et al. | 99/348 |

FOREIGN PATENT DOCUMENTS 56-75047 6/1981 Japan .

*Primary Examiner*—Timothy F. Simone
*Attorney, Agent, or Firm*—Foley & Lardner, Schwartz, Jeffery, Schwaab, Mack, Blumenthal & Evans

[57] ABSTRACT

A bread baking apparatus includes a container for containing dough stuffs, an impeller for agitating and kneading the dough stuffs, an electric motor for rotating the impeller, an electric heater for heating the dough stuffs, a buzzer for alarming to inform an operator of the time when a gas removing operation is to be manually executed so that gas contained in dough is removed, and a microcomputer-based operation control circuit operating to selectively execute either an automatic baking course or a manual gas removal course. Upon selection of the automatic baking course, kneading, fermenting and baking steps for the dough stuffs are sequentially executed and the impeller is rotated for a short period in the fermenting step for automatic execution of a gas removing operation for dough. Upon selection of the manual gas removal course, the kneading and fermenting steps are automatically executed. The buzzer is energized at the time when a manual gas removing operation is to be performed and the operating control circuit operates to interrupt the fermenting step. The operator then takes the dough out of the container and kneads it by hand or with a rolling pin.

14 Claims, 7 Drawing Sheets

BREAD BAKING APPARATUS

BACKGROUND OF THE INVENTION

The present invention relates to a bread baking apparatus wherein kneading, fermenting, baking steps and the like are sequentially executed for dough stuffs contained in a container.

The above-mentioned bread baking apparatus has been commercially produced as an electric home bakery. Such a home bakery comprises a container, an impeller provided in the inner bottom of the container so as to be driven by an electric motor, and an electric heater provided under the container for baking dough. Upon turn-on of a start switch, the dough stuffs contained in the container are agitated and kneaded by the impeller, thereby obtaining the dough. The dough is thereafter fermented by yeast and then baked by the heater, thereby obtaining bread. In a fermenting step, the temperature of the container is detected by detecting means and the heater is energized when the temperature of the container is too low for the fermentation. The temperature of the container is thus maintained at a value suitable for the fermentation. The impeller is rotated for a short period during the fermenting step so that a gas removing operation is intermittently performed in order that gas or bubbles contained in the dough are removed.

The above-described prior art bread baking apparatus provides for much convenience since operation steps from the kneading step to the baking step are automatically performed in sequence. However, the prior art bread baking apparatus has a disadvantage that the bread baked by the apparatus has a somewhat bad appearance.

This disadvantage results from the circumstances that the appearance of the baked bread depends on whether or not the gas removing operation has been performed skillfully. In the prior art bread baking apparatus, the impeller is rotated at the same speed in the gas removing operation as in the kneading step. As a result, the baked bread surface is sometimes rendered rough or the bread sometimes has a lot of relatively large internal cavities, thereby spoiling the appearance of the bread. It is further considered that such a bad appearance is due to the fact that gluten of the dough is cut into pieces by the impeller rotated at high speed, thereby intensifying damage of the baked bread. While, when the rotation speed of the impeller is reduced, bubbles contained in the dough are not sufficiently removed, which also causes the formation of the relative large cavities in the bread.

SUMMARY OF THE INVENTION

Therefore, an object of the present invention is to provide a bread baking apparatus wherein a proper gas removing operation can be performed when an operator makes much of the appearance of the baked bread and while, wherein the bread baking operation from the kneading step to the baking step is automatically executed when the operator makes much of easiness of baking bread.

According to one aspect of the invention, the bread baking apparatus comprises a container for containing dough stuffs, an impeller for agitating and kneading the dough stuffs contained in the container, an electric motor for rotating the impeller, an electric heater for heating the dough stuffs contained in the container, alarming means for alarming to inform an operator of the time when a gas removing operation is to be manually executed so that gas contained in the dough is removed, and operation control circuit means. The operation control circuit means selects either an automatic baking course or a manual gas removal course to be executed when operated by the operator and controls the motor and heater when the automatic baking course is selected, so that kneading, fermenting and baking steps for the dough stuffs are sequentially executed and so that the impeller is rotated for a predetermined short period during the fermenting step of the automatic baking course for execution of the gas removing operation. The operation control circuit means further controls the motor and heater when the manual gas removal course is selected, so that the kneading and fermenting steps are sequentially executed and so that the alarming operation is performed by the alarming means when the gas removing operation is to be performed during the fermenting step of the manual gas removal course, thereby interrupting the fermenting step.

When the operator makes much of easiness of baking bread, the automatic baking course is selected such that the operation steps from the kneading step to the baking step are automatically executed as well as the gas removing operation. While, when the operator makes much of a good appearance of the baked bread, the manual gas removal course is selected such that the alarming operation is performed by the alarming means during the fermenting step when the gas removing operation is to be manually executed, thereby interrupting the fermenting step. When the alarming operation is performed, the operator takes the dough in the midst of fermenting out of the container and kneads the same by hand or with a suitable rolling pin to remove gas contained in the dough, thereby performing the gas removing operation without any damage to the dough. Thereafter, the dough is returned into the container so that the fermenting and baking steps are executed, thereby obtaining bread with a fine appearance.

In another aspect of the invention, when the manual gas removal course is selected, the fermenting step interrupted for the alarming operation is thereafter restarted by a step restarting operation by the operator, thereby sequentially executing the remainder of the fermenting step and the baking step subsequently.

In further another aspect of the invention, the gas removing operation is executed at N times at the fermenting step in the automatic baking course where N represents an integer of 2 or above. The gas removing operation is automatically executed at (N−1) times by way of rotating the impeller in the manual gas removal course and the alarming operation of the alarming means is executed when the last gas removing operation is to be performed, thereby interrupting the manual gas removal course. Since the last gas removing operation is performed by the operator, the appearance of the baked bread is improved and the operator's labor is minimized.

In the above-described aspect, the interrupted manual gas removal course is restarted by the restarting operation by the operator after the gas removing operation is manually performed by the operator, thereby executing the remainder of the fermenting step and baking step sequentially.

In further another aspect of the invention, the operation control circuit means selects either an automatic baking course or a manual gas removal course to be executed when operated by the operator and controls the motor and heater when the automatic baking course is selected, so that kneading, first fermenting, first gas removing, second fermenting, second gas removing, shaping fermentation and baking steps are sequentially executed. The operation control circuit means further controls the motor and heater when the manual gas removal course is selected, so that kneading, first fermenting, first gas removing and second fermenting steps are sequentially executed and so that the alarming operation is executed by the alarming means when the second fermenting step is completed, thereby interrupting the manual gas removal course and so that the interrupted manual gas removal course is restarted by the restarting operation by the operator, thereby executing the shaping fermentation and baking steps.

According to further another aspect of the invention, the bread baking apparatus comprises a container for containing dough stuffs, an impeller for agitating and kneading the dough stuffs contained in the container, an electric motor for rotating the impeller, an electric heater for heating the dough stuffs contained in the container, detecting means for detecting an execution and nonexecution of the manual gas removing operation by the operator, alarming means for alarming to inform the operator of the time when the manual gas removing operation is to be performed by the operator, and operation control circuit means. The operation control circuit means controls the motor and heater so that kneading and fermenting steps are sequentially executed and so that the alarming operation is performed by the alarming means during the fermenting step when the manual gas removing operation is to be performed by the operator, thereby interrupting the fermenting step. The operation control circuit means further controls the motor and heater so that the interrupted fermenting step is restarted when the detecting means detects the execution of the manual gas removing operation by the time a predetermined short period elapses from the interruption of the fermenting step, thereby sequentially executing the fermenting and baking steps. The operation control circuit means further controls the motor and heater so that the impeller is rotated for a predetermined period to execute the gas removing operation when the detecting means detects the nonexecution of the manual gas removing operation, thereby restarting the fermenting step and thereafter executing the baking step.

According to the above-described arrangement, the alarming operation is performed by the alarming means when the manual gas removing operation is to be performed by the operator during the fermenting step, thereby interrupting the fermenting step. When the operator makes much of a good appearance of the baked bread, the operator takes the dough in the midst of fermenting out of the container and the gas removing operation is performed by hand or with a rolling pin. The dough is thereafter returned into the container. When the detecting means detects the execution of the manual gas removing operation, the fermenting step is restarted and the baking step is executed. While, when the operator wishes to bake the bread without any labor, the dough is not taken out of the container even when the alarming operation is performed by the alarming means. When the detecting means detects the nonexecution of the manual gas removing operation at the time when a predetermined period elapses after the interruption of the fermenting step, the impeller is rotated by the motor for the predetermined short period so that the gas removing operation is automatically executed and then, the operation is executed from the fermenting step to the baking step. Accordingly, the dough may be prevented from being left in the container for a long time after the alarming operation, thereby ensuring the bread baking.

In the above-described construction, it is desirable that the detecting means be adapted to perform the detecting operation in several minutes after the interruption of the fermenting step. Requiring more time for the detection affects the fermenting action.

In further another aspect, the bread baking apparatus includes an outer case provided for enclosing the container and having an upper open end and a lid closing and opening the upper end of the outer case. The detecting means may comprise a switch detecting the opening and closure of the lid.

Furthermore, the bread baking apparatus includes an outer case enclosing the container by detachably attaching the container thereto. The detecting means may comprise a switch detecting the attachment and detachment of the container. The switch may be advantageously utilized as a safety switch inhibiting the start of the operation of the bread baking apparatus when the container is not enclosed in the outer case.

Furthermore, the above-described detecting means may comprise a photoelectric switch changing the output state thereof in accordance with an amount of received light depending on the execution and nonexecution of the manual gas removing operation.

Furthermore, the above-described operation control circuit means may comprise a microcomputer provided with a timing means for timing the predetermined period after interruption of the fermenting step.

Furthermore, the operation control circuit means may control the motor and heater so that kneading, first fermenting, first gas removing, and second fermenting steps for the dough stuffs contained in the container are sequentially executed and so that the alarming operation is performed by the alarming means when the second fermenting step is completed, thereby interrupting the manual gas removal course. The operation control circuit means further controls the motor and heater so that the shaping fermentation and baking steps are sequentially executed when the detecting means detects the execution of the manual gas removing operation by the time the predetermined period elapses from the interruption of the manual gas removal course and so that the impeller is rotated for a predetermined short period to execute the gas removing operation when the detecting means detects the nonexecution of the manual gas removing operation, thereby restarting the fermenting step and thereafter executing the baking step.

According to the above-described bread baking apparatus, the first gas removing step is automatically executed by the impeller and accordingly, only the second gas removing step is manually performed by the operator, thereby minimizing the operator's labor.

According to further another aspect of the invention, the bread baking apparatus comprises a container for containing dough stuffs, an impeller for agitating and kneading the dough stuffs contained in the container, an electric motor for rotating the impeller, an electric heater for heating the dough stuffs contained in the container, detecting means for detecting execution and nonexecution of a manual gas removing operation by an operator, alarming means for alarming to inform the operator of the time when the manual gas removing operation is to be performed by the operator, and operation control circuit means. The operation control circuit means selects either an automatic baking course or a manual gas removal course to be executed when operated by an operator and controls the motor and heater when the automatic baking course is selected, so that kneading and fermenting steps are sequentially executed and so that the impeller is rotated for a predetermined short period during the fermenting step in order that the gas removing operation is performed. The operation control circuit means further controls the motor and heater when the manual gas removal course is selected, so that the kneading and fermenting steps are sequentially executed and so that the alarming operation is performed by the alarming means when the gas removing operation is to be performed during the fermenting step of the manual gas removal course, thereby interrupting the fermenting step, and third control means for controlling the motor and heater so that the interrupted fermenting step is restarted when the detecting means detects the execution of the manual gas removing operation by the time a predetermined period elapses from the interruption of the fermenting step, thereby sequentially executing the fermenting and baking steps. The operation control circuit means further controls the motor and heater so that the impeller is rotated for a predetermined short period to execute the gas removing operation when the detecting means detects the nonexecution of the manual gas removing operation, thereby restarting the fermenting step and thereafter executing the baking step.

Even if the gas removing operation is not performed by the operator in the manual gas removal course, bread is automatically baked.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 2:
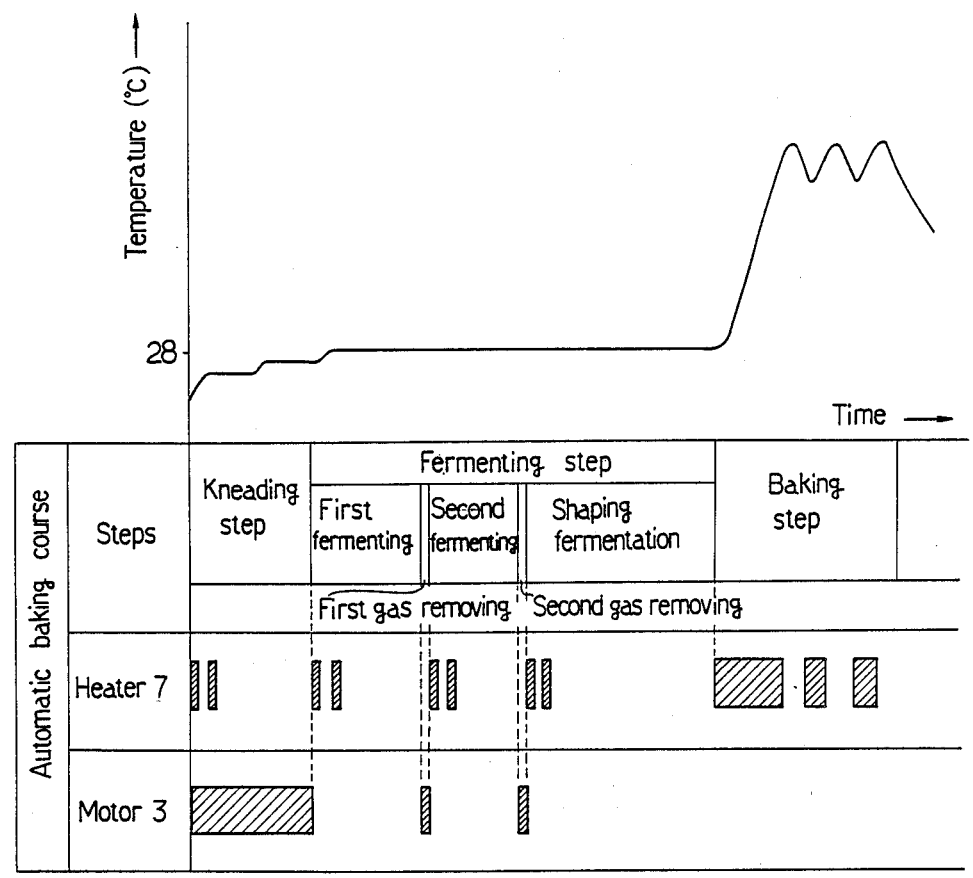
FIG. 2 is a time chart explaining the automatic baking course employed in the bread baking apparatus.
Figure 3:
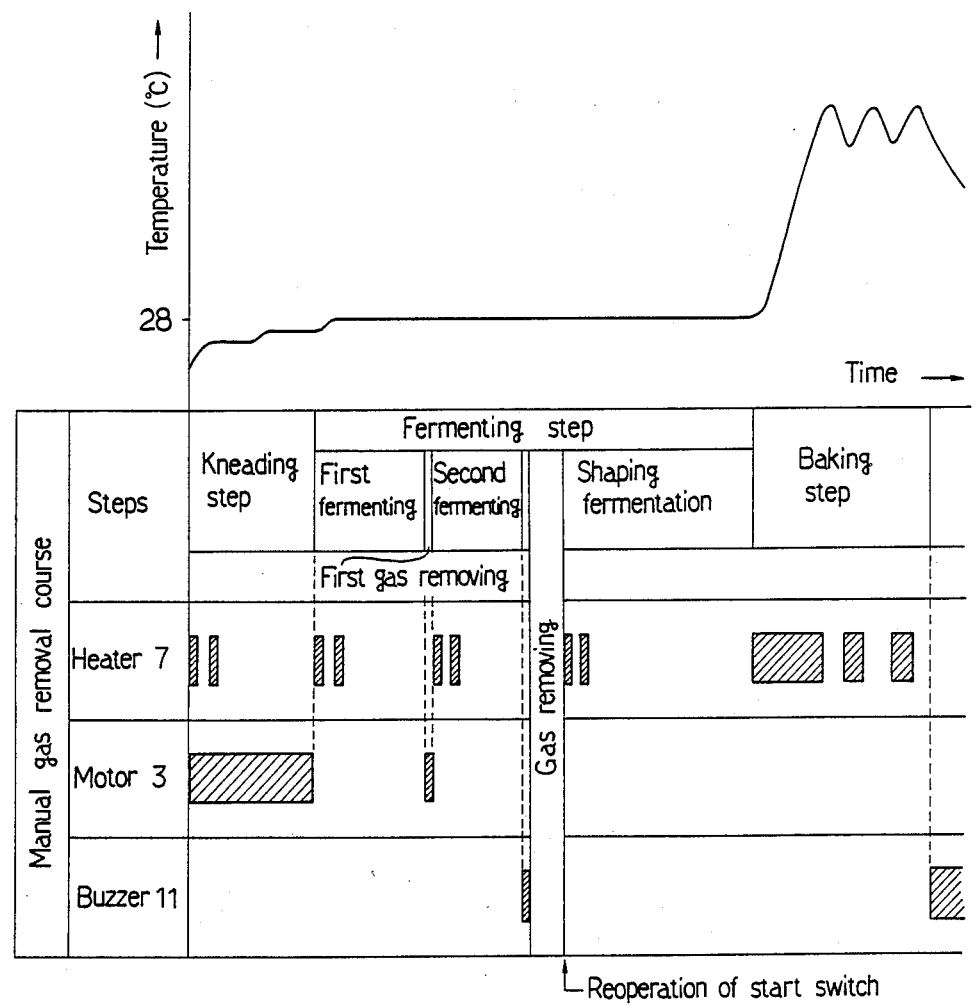
FIG. 3 is a time chart explaining the manual gas drainage course employed in the bread baking apparatus.
Figure 4:
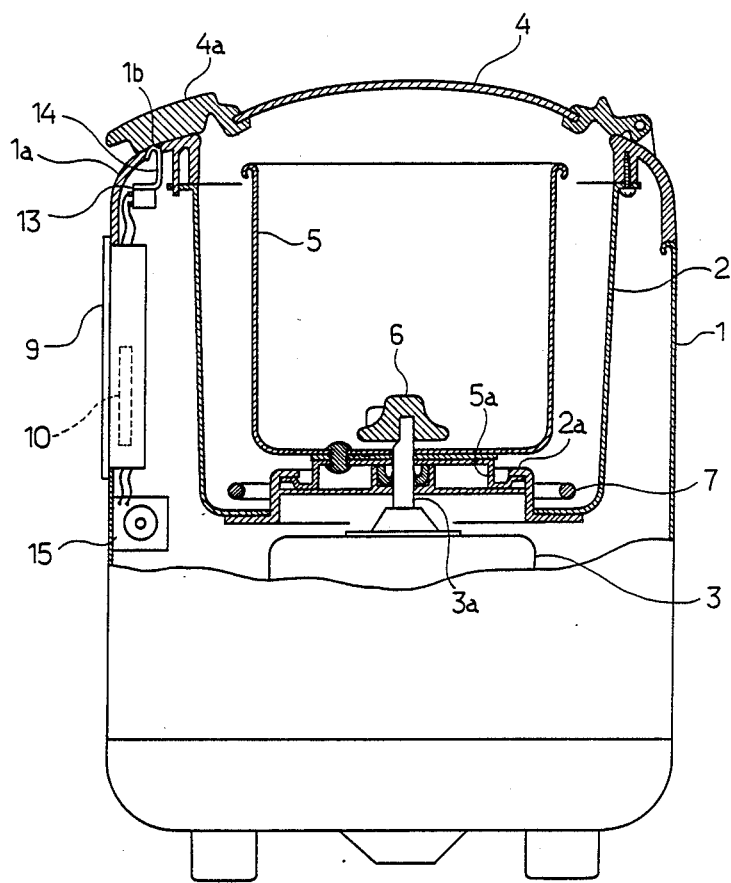
FIG. 4 is a partially broken side view of the bread baking apparatus of a second embodiment.
Figure 5:
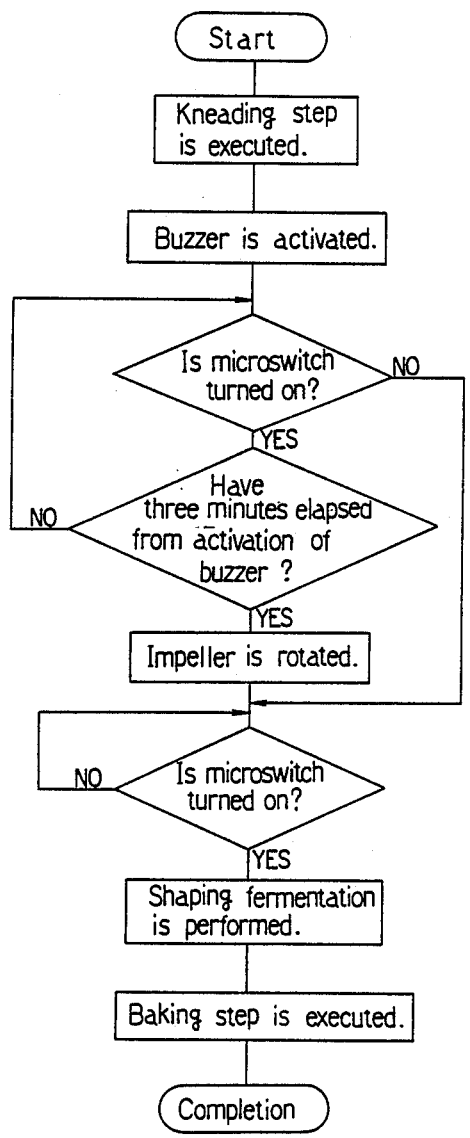
FIG. 5 is a flowchart explaining a control manner of the operation control circuit means employed in the bread baking apparatus.

A first embodiment of the present invention will now be described with reference to FIGS. 1 to 3.

Figure 1:
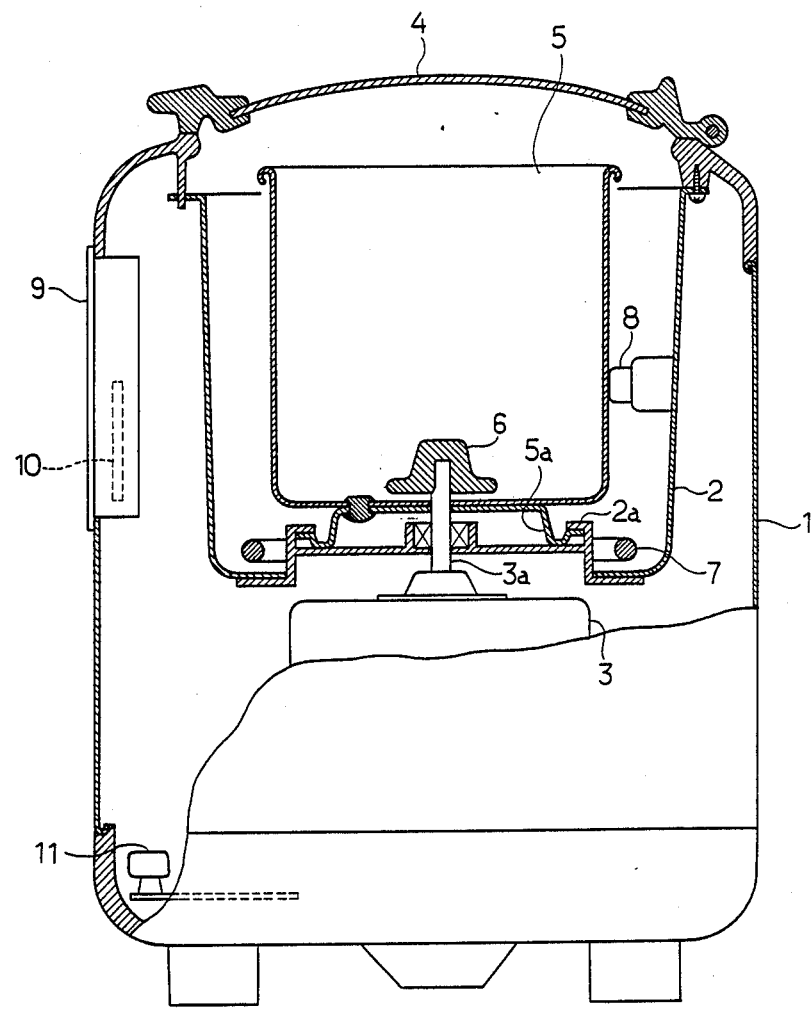
FIG. 1 is a partially broken side view of the bread baking apparatus of a first embodiment in accordance with the invention.

Referring first to FIG. 1, an outer case 1 is formed into a rectangular box shape with an upper open end. An inner case 2 and an electric motor 3 for the kneading operation are mounted in the outer case 1. A lid 4 is provided for closing and opening the upper open end of the outer case 1. A rectangular box-shaped container 5 having an upper open end is detachably mounted in the inner case 2. More specifically, the container 5 has a fixture 5a provided on the outer bottom thereof, and a bayonet plug portion of the fixture 5a is engaged with a bayonet socket 2a provided on the inner bottom of the inner case 2. A rotational shaft 3a of the motor 3 is vertically projected through openings formed in the bottom portions of the inner case 2 and container 5, respectively. An impeller 6 is detachably mounted on the rotational shaft 3a of the motor 3. An electric heater 7 for fermenting and baking operations is provided on the interior bottom of the inner case 2. A temperature detector 8 having a built-in thermistor (not shown) is mounted on the inner side wall of the inner case 2 so that the outer side wall of the container 5 is always brought into contact therewith when the container 5 is mounted in position. Data of the temperature of dough detected by the temperature detector 8 through the side wall of the container 5 is supplied to an operation control circuit 10 of an operation panel 9 mounted on the outer side wall of the outer case 1. A buzzer 11 is provided at the lower interior of the outer case 1 for alarming to inform an operator of the time when a manual gas removing operation is to be performed by the operator in order that gas or bubbles formed in the dough are removed, as will be hereinafter described in detail.

The operation control circuit 10 comprises a microcomputer (not shown) and is adapted to control energization and deenergization of the motor 3 and heater 7. A selecting switch (not shown) as a selecting means is provided in the operation panel 9 for the operator selecting either an automatic baking course or a manual gas removal course. In the automatic baking course, kneading, fermenting and baking steps are sequentially executed. The operator first puts dough stuffs into the container 5 and selects the automatic baking course. Upon turn-on of a start switch (not shown), the kneading, fermenting and baking steps for the dough stuffs contained in the container 5 are automatically executed in sequence. The gas removing operation is executed twice in the fermenting step of the automatic baking course, as will be hereinafter described. While, in the manual gas removal course, the kneading and fermenting steps are sequentially executed. When the last gas removing operation is to be performed, the buzzer 11 is activated so that the alarming operation is performed instead of execution of the last gas removing operation, thereby interrupting the fermenting step.

Operation of the bread baking apparatus will now be described with reference to FIGS. 2 and 3 as well as FIG. 1. The following description of the operation will make it clear the software contents of the microcomputer of the operation control circuit 9.

(1) Execution of the Automatic Baking Course

The dough stuffs such as wheat flour, water, and yeast are put into the container 5 and the selecting switch is operated so that the automatic baking course is selected. Upon turn-on of the start switch, the kneading step is first executed. In the kneading step, the motor 3 is energized for a predetermined period so that the impeller 6 is rotated, thereby agitating and kneading the dough stuffs into dough. The heater 7 is also energized for a predetermined short period so that the temperature of the dough is increased to the value suitable for the fermentation. Upon completion of the kneading step, the fermenting step is started. As shown in FIG. 2, the fermenting step includes three fermenting operations, that is, a first fermenting, second fermenting and shaping fermentation and two gas removing operations, that is, a first gas removing and second gas removing. The impeller 6 is rotated for a predetermined short period in each gas removing operations. For example, the impeller 6 is rotated for 8 seconds in the first gas removing operation and for 2 seconds in the second gas removing operation. In each gas removing operation, the dough is kneaded so that gas or bubbles are removed from the dough. The fermenting step also has a function of rounding and shaping the dough. Further, the heater 7 is intermittently energized at short intervals at the initial stage of each fermenting operation so that the temperature of the dough is maintained at the value suitable for the fermentation, for example, at 28° C. Upon completion of the fermenting step, the baking step is started. In the baking step, the heater 7 is continuously energized at first so that the temperature of the dough increases to a high value. Thereafter, the heater 7 is intermittently energized so that the temperature of the dough is maintained at approximately 200° C. The heater 7 is deenergized after elapse of a period suitable for baking the dough, thereby completing the baking step.

(2) Execution of the Manual Gas Removal Course

When making much of state of the baked bread, the operator selects the manual gas removal course with the selecting switch. When the start switch is turned on after the dough stuffs are put into the container 5, the kneading step is first executed as in the automatic baking course, as shown in FIG. 3. The fermenting step is started upon completion of the kneading step. The fermenting step of the manual gas removal course differs from that of the automatic baking course as follows: the first fermenting, first gas removing and second fermenting operations are performed in the fermenting step of the manual gas removal course as in the automatic baking course. Subsequently, when the second or last gas removing operation is to be performed, the buzzer 11 is activated for 2 seconds instead of the second gas removing operation, thereby executing the alarming operation. The shaping fermentation operation is not started when the alarming operation is executed, thereby interrupting the fermenting step. Activation of the buzzer 11 informs the operator of the time when the manual gas removing operation is to be performed. Then, the lid 4 is opened and the dough in the midst of fermentation is taken out of the container 5. The dough is kneaded by hand or with a rolling pin, thereby carefully removing gas from the dough. The dough is returned into the container 5 after the manual gas removing operation, and the lid 4 is closed. When the start switch serving as step restarting means is turned on, the microcomputer operates to restart the operation of the apparatus from the shaping fermentation operation. Upon completion of the shaping fermentation operation, the baking step is executed as in the automatic baking course, thereby obtaining bread baked in the container 5.

According to the bread baking apparatus of the first embodiment, the operator may select the manual gas removal course when making much of fine appearance of the baked bread. Since the alarming operation is performed by the buzzer 11 with the second gas removing operation unexecuted by the apparatus, the operator may take the dough out of the container 5 and carefully remove the bubbles therefrom by hand or with rolling pin. Consequently, the bread having no large inside cavities and fine appearance can be obtained. The operator may, of course, select the automatic baking course to automatically bake bread when the operator does not make so much of the appearance of the baked bread.

Although the gas removing operation is performed twice in the fermenting step in the foregoing embodiment, it may be performed at least once. When the gas removing operation is performed at N times where N represents an integer of 2 or above, it is generally desirable that the gas removing operation be automatically performed at (N−1) times in the manual gas removal course and that the alarming operation be performed by the alarming means instead of execution of the last gas removing operation when the last gas removing operation is to be executed, thereby interrupting the fermenting step, as described above. Thus, when the last gas removing operation is manually performed carefully, the bread with a fine appearance may be obtained and the operator's labor may be minimized.

A second embodiment of the invention will now be described with reference to FIGS. 4 to 7. The identical parts are labeled by the same reference numerals as in the foregoing embodiment. A microswitch 13 serving as manual gas removal detecting means is mounted on an upper frame 1a of the outer case 1 so as to be placed in the vicinity of a holding portion 4a of the lid 4. An actuator 14 for turning the microswitch 13 on and off is upwardly projected through an aperture 1b formed in the upper frame 1a. When the lid 4 is closed, the underside of the holding portion 4a downwardly pushes the actuator 14, thereby turning the microswitch 13 on. When the lid 4 is opened, the actuator 14 pushed by the holding portion 4a is released to move upwardly, thereby turning the microswitch 13 off. A buzzer 15 serving as alarming means is identical with that in the foregoing embodiment but mounted on the inner side wall of the outer case 1. In the second embodiment, the microcomputer of the operation control circuit 10 is provided with data of a manual gas removal course and an automatic gas removal course, as will be described hereinafter.

The control manner of the operation control circuit 10 employed in the apparatus of the second embodiment will now be described. In the following description, reference to FIGS. 5 to 7 will enhance the understanding of the control manner of the operation control circuit 10.

Figure 6:
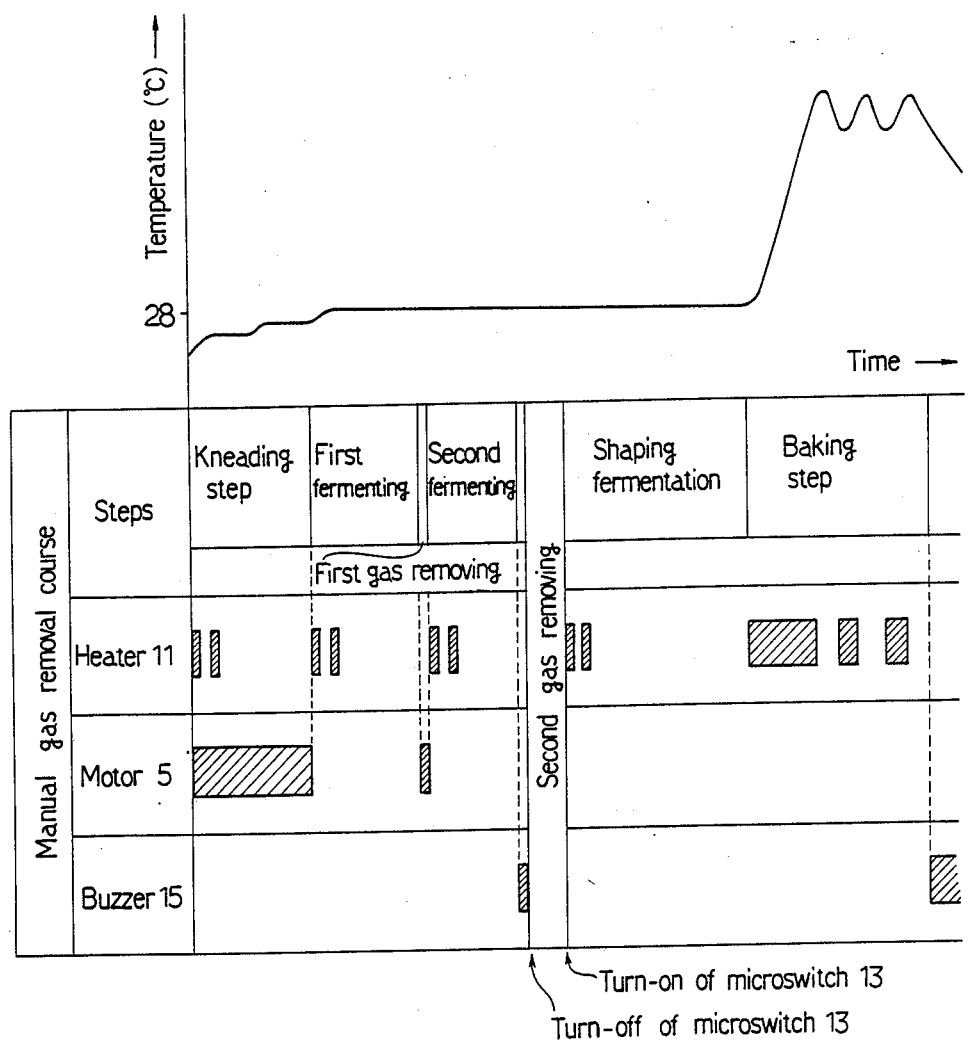
FIG. 6 is a time chart in the case that the manual gas removing operation is performed.
Figure 7:
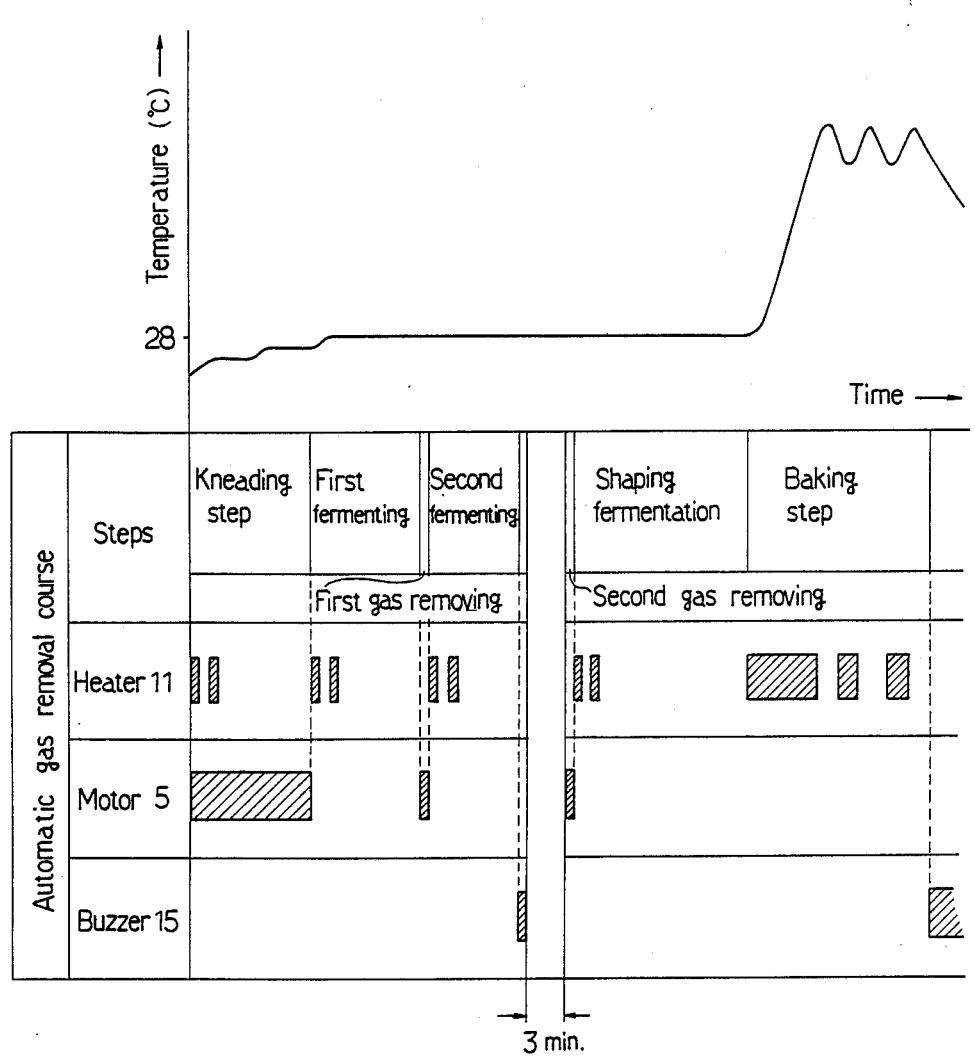
FIG. 7 is a time chart in the case that the manual gas removing operation is not performed.

The lid 4 is closed after the dough stuffs such as wheat flour, water, yeast are put into the container 5. Depression of the start switch on the operation panel 9 starts the kneading step in which the dough stuffs are kneaded by the impeller 6 driven by the motor 3. Further, the heater 7 is energized for a short period so that the temperature of the dough increases to a value suitable for the fermentation. After completion of the kneading step, the first fermenting, first gas removing and second fermenting operations are sequentially performed. Upon completion of the second fermenting operation, a signal is supplied from the operation control circuit 10 to the buzzer 15, which is activated. The manual gas removal course shown in FIG. 6 is identical with the automatic baking course shown in FIG. 7 in the process from the start of the kneading step to the activation of the buzzer 15. Therefore, the course selection required at the start of the operation in the first embodiment is not needed in the apparatus of the second embodiment. Whether or not the manual gas removing operation is executed differentiates the manual gas removal course from the automatic gas removal course, as will be hereinafter described. Thus, when the operator makes much of a fine appearance of the baked bread, the lid 4 is opened by the operator and the dough is taken out of the container 5 in accordance with the manual gas removal course upon activation of the buzzer 15. The operator then kneads the dough carefully by hand or with a rolling pin, thereby performing the second gas removing operation. In such a case, the opening of the lid 4 departs the holding portion 4a from the actuator 14, thereby turning the microswitch 13 off. An "off" signal is supplied from the microswitch 13 to the microcomputer of the operation control circuit 10. Upon receipt of the "off" signal, the microcomputer determines that the manual gas removing operation is to be performed. Subsequently, the operation of the apparatus is automatically executed in sequence in accordance with data of the manual gas removal course stored in a ROM (not shown) incorporated in the microcomputer. More specifically, the dough is returned into the container 5 and the lid 4 is closed after the second gas removing operation is manually performed by the operator. Closure of the lid 4 downwardly pushes the actuator 14, thereby turning the microswitch 13 on. An "on" signal is supplied from the microswitch 13 to the microcomputer of the operation control circuit 10. Upon receipt of the "on" signal, the microcomputer determines that the second gas removing operation has been completed. Subsequently, the shaping fermentation and the baking step are executed. Upon elapse of a predetermined period during which the dough is baked well, the heater 7 is deenergized, thereby completing the baking step. The buzzer 15 is then activated for alarming to inform the operator of the completion of the baking step.

While, in the automatic gas removal course, the operation of the apparatus progresses in accordance with the following process after activation of the buzzer 15 which informs the operator of the start of the second gas removing operation: after activation of the buzzer 15, timing means (not shown) built in the microcomputer of the operation control circuit 10 starts timing a preset period, for example, 3 minutes. When the lid 4 is not opened by the time 3 minutes elapse from activation of the buzzer 15 or when the "off" signal is not supplied from the microswitch 13 to the microcomputer by the time 3 minutes elapse from activation of the buzzer 15, the microcomputer determines that the manual gas removing operation has not been performed, thereby automatically executing the automatic gas removal course data of which is stored in the ROM of the microcomputer. Accordingly, when the lid 4 is not opened after activation of the buzzer 15, the impeller 6 is rotated for a short period after elapse of 3 minutes, thereby automatically executing the second gas removing operation. Subsequently, the shaping fermentation operation and the baking step are executed. The buzzer 15 is activated upon completion of the baking step, thereby informing the operator of the completion of the baking step.

According to the bread baking apparatus of the second embodiment, the signal is supplied from the microswitch 13 to the microcomputer of the operation control circuit 10. Upon receipt of the signal, the microcomputer determines whether or not the manual gas removing operation has been performed. When the manual gas removing operation has been performed, the operation of the apparatus is changed to the shaping fermentation operation. When the manual gas removing operation has not been executed, the impeller 6 is rotated to thereby execute the second or automatic gas removing operation and then, the shaping fermentation is performed. Consequently, even when any engagement, business or the like prevents the operator from manually performing the second gas removing operation although the operator intended to perform the second gas removing operation by hand or with a rolling pin at the first, the operation step is automatically changed so that the second gas removing operation is automatically executed. Accordingly, the operator may not be required of an extra operation of the operation panel. Furthermore, even when the operator forgets starting to bake bread with the bread baking apparatus, the operation of the apparatus is also changed to the automatic gas removal course in the same manner as described above, thereby preventing the occurrence of case where bread is not baked or where the dough is left in the container for a long time to be excessively fermented.

Although the microcomputer in the second embodiment determines whether or not the manual gas removing operation has been performed, at an interval of 3 minutes after activation of the buzzer 15, the interval is not limited to 3 minutes. However, since too long interval affects the fermentation of the dough, it is desirable that the interval be set at several minutes.

Further, although the manual gas removal detecting means comprises the switch detecting the opening and closure of the lid 4, the detecting means may comprise a switch detecting detachment and attachment of the container 5 from and to the inner case 2. Further, the detecting switch may also serve as a safety switch for preventing the start of the operation of the apparatus when the container is not mounted on the inner case 2. Thus, a single switch can be utilized for two purposes.

Further, a photoelectric switch having light emitting and receiving sections may be mounted on the inner side of the lid 4 as the manual gas removal detecting means. In the case of such a photoelectric switch, since the degree of expansion of the dough is dependent on whether or not the manual gas removing operation is performed, the photoelectric switch is turned on and off by changing an amount of light impinging on the light receiving section or reflected on the surface of the dough in accordance with the degree of expansion of the dough, thereby determining whether or not the manual gas draining operation has been performed.

Further, the bread baking apparatus of the first embodiment may be provided with the manual gas removal detecting switch. After the alarming means is activated such that the fermenting step is interrupted, the fermenting step may be restarted when the microcomputer determines that the manual gas removing operation has been performed by the time a predetermined period elapses from the interruption of the fermenting step, thereby executing the fermenting and baking steps. When the microcomputer determines that the manual gas removing operation has not been executed, the impeller may be rotated so that the gas removing operation is performed and thereafter, the fermenting and baking steps may be executed. Even when the manual gas draining operation is not performed by the operator for any reason in the case that the manual gas removal course has been selected, the dough is automatically baked, thereby obtaining bread.

Further, a light emitting element and other means may be employed as the alarming means instead of the buzzer.

The foregoing disclosure and drawings are merely illustrative of the principles of the present invention and are not to be interpreted in a limiting sense. The only limitation is to be determined from the scope of the appended claims.

What we claim is:

1. A bread baking apparatus comprising:
   (a) a container for containing dough stuffs;
   (b) an impeller for agitating and kneading the dough stuffs contained in the container;
   (c) an electric motor for rotating the impeller;
   (d) an electric heater for heating the dough stuffs contained in the container;
   (e) alarming means for alarming to inform an operator of the time when a gas removing operation is to be manually executed so that gas contained in dough is removed; and
   (f) operation control circuit means selecting either an automatic baking course or a manual gas removal course to be executed when operated by the operator, said operation control circuit means controlling the motor and heater when the automatic baking course is selected, so that kneading, fermenting and baking steps for the dough stuffs contained in the container are sequentially executed and so that the impeller is rotated for a predetermined short period in the fermenting step of the automatic baking course for execution of the gas removing operation, said operation control circuit means further controlling the motor and heater when the manual gas removal course is selected, so that the kneading and fermenting steps are sequentially executed and so that the alarming operation is performed by the alarming means when the gas removing operation is to be performed in the fermenting step, thereby interrupting the fermenting step.

2. A bread baking apparatus according to claim 1, wherein when the manual gas removal course is selected, the fermenting step interrupted for the alarming operation is thereafter restarted in response to a step restarting operation by the operator, thereby sequentially executing the remainder of the fermenting step and the baking step subsequently.

3. A bread baking apparatus according to claim 1, wherein the gas removal operation is executed at N times at the fermenting step in the automatic baking course where N represents an integer of 2 or above and wherein the gas removing operation is automatically executed at (N−1) times by way of rotating the impeller in the manual gas removal course and the alarming operation of the alarming means is executed at the time when the last gas removing operation is to be performed, thereby interrupting the fermenting step.

4. A bread baking apparatus according to claim 1, wherein the operation control circuit means selects either the automatic baking course or manual gas removal course to be executed when operated by the operator and wherein when the automatic baking course is selected, said operation control circuit means controls the motor and heater so that kneading, fermenting and baking steps for the dough stuffs contained in the container are sequentially executed and so that the gas removing operation is executed by way of rotating the impeller at N times at the fermenting step in the automatic baking course where N represents an integer of 2 or above, said operation control circuit means further controlling the motor and heater when the manual gas removal course is selected, so that the kneading and fermenting steps are automatically executed in sequence and so that the gas removing operation is executed by way of rotating the impeller at (N−1) times in the fermenting step and the alarming operation of the alarming means is executed at the time when the last gas removing operation is to be performed, thereby interrupting the fermenting step, said operation control circuit means further controlling the motor and heater in the manual gas removal course so that the interrupted fermenting step is restarted in response to the step restarting operation by the operator, thereby automatically executing the remainder of the fermenting step and the baking step.

5. A bread baking apparatus according to claim 1, wherein the operation control circuit means selects either the automatic baking course or manual gas removal course to be executed when operated by the operator and wherein when the automatic baking course is selected, said operation control circuit means controls the motor and heater so that first fermenting, first gas removing, second fermenting, second gas removing, shaping fermentation, and baking steps for the dough stuffs contained in the container are sequentially executed, said operation control circuit means further controlling the motor and heater when the manual gas removal course is selected, so that kneading, first fermenting, first gas removing, and second fermenting steps are sequentially executed and so that the alarming operation is performed by the alarming means when the second fermenting step is completed, thereby interrupting the manual gas removal course and so that the interrupted manual gas removal course is restarted in response to the step restarting operation by the operator during the interruption thereof, thereby executing the shaping fermentation and baking steps.

6. A bread baking apparatus comprising:
   (a) a container for containing dough stuffs;
   (b) an impeller for agitating and kneading the dough stuffs contained in the container;
   (c) an electric motor for rotating the impeller;
   (d) an electric heater for heating the dough stuffs contained in the container;
   (e) detecting means for detecting execution and non-execution of a manual gas removing operation by an operator;
   (f) alarming means for alarming to inform the operator of the time when the manual gas removing operation is to be performed by the operator; and
   (g) operation control circuit means controlling the motor and heater so that kneading and fermenting steps are sequentially executed and so that the alarming operation is performed by the alarming means during the fermenting step when the manual gas removing operation is to be performed by the operator, thereby interrupting the fermenting step, said operation control circuit means further controlling the motor and heater so that the interrupted fermenting step is restarted when determining, based on the detecting operation of the detecting means, that the manual gas removing operation has been executed by the operator by the time a predetermined period elapses from the interruption of the fermenting step, thereby sequentially executing the fermenting and baking steps, said operation control circuit means further controlling the motor and heater so that the impeller is rotated for a predetermined short period to execute the gas removal operation when determining, based on the detecting operation of the detecting means, that the manual gas removing operation has not been executed by the operator, thereby restarting the fermenting step and thereafter executing the baking step.

7. A bread baking apparatus according to claim 6, wherein the detecting means detects the execution or nonexecution of the manual gas removing operation at an interval of several minutes after interruption of the fermenting step.

8. A bread baking apparatus according to claim 6, which further comprises an outer case enclosing the container and having an upper open end and a lid closing and opening the upper open end of the outer case and wherein the detecting means comprises a switch detecting the opening and closure of the lid.

9. A bread baking apparatus according to claim 6, which further comprises an outer case and an inner case enclosed by the outer case, the container being detachably attached to the inner case and wherein the detecting means comprises a switch detecting the attachment and detachment of the container.

10. A bread baking apparatus according to claim 6, which further comprises an outer case and an inner case enclosed by the outer case, the container being detachably attached to the inner case and wherein the detecting means comprises a switch detecting the attachment and detachment of the container, the switch also serving as a safety switch inhibiting the start of the operation of the bread baking apparatus when the container is detached from the inner case.

11. A bread baking apparatus according to claim 6, wherein the detecting means comprises a photoelectric switch changing the output state thereof in accordance with the change of an amount of received light depending on the execution and nonexecution of the manual gas removing operation for the dough in the container.

12. A bread baking apparatus according to claim 6, wherein the operation control circuit means comprises a microcomputer provided with a timing means for timing the predetermined period after interruption of the fermenting step.

13. A bread baking apparatus according to claim 6, wherein the operation control circuit means controls the motor and heater so that kneading, first fermenting, first gas removing, and second fermenting steps for the dough stuffs contained in the container are sequentially executed and so that the alarming operation is performed by the alarming means at the time when the second fermenting step is completed, thereby interrupting operation of the bread baking apparatus and wherein said operation control circuit means further controls the motor and heater so that the shaping fermentation and baking steps are sequentially executed when determining, based on the detecting operation of the detecting means, that the manual gas removing operation has been executed by the time a predetermined period elapses from the interruption of the fermenting step and so that the impeller is rotated for a predetermined short period to execute the gas removing operation when determining, based on the detecting operation of the detecting means, that the manual gas removing operation has not been executed, by the time the predetermined period elapses from the interruption of the fermenting step, thereby restarting the fermenting step and thereafter executing the baking step.

14. A bread baking apparatus comprising:
(a) a container for containing dough stuffs;
(b) an impeller for agitating and kneading the dough stuffs contained in the container;
(c) an electric motor for rotating the impeller;
(d) an electric heater for heating the dough stuffs contained in the container;
(e) detecting means for detecting execution and nonexecution of a manual gas removing operation by an operator;
(f) alarming means for alarming to inform the operator of the time when the manual gas removing operation is to be performed by the operator; and
(g) operation control circuit means selecting either an automatic baking course or a manual gas removal course to be executed when operated by an operator and controlling the motor and heater when the automatic baking course is selected, so that kneading and fermenting steps are sequentially executed and so that the impeller is rotated for a predetermined short period during the fermenting step in order that the gas removing operation is performed, said operation control circuit means controlling the motor and heater when the manual gas removal course is selected, so that the kneading and fermenting steps are sequentially executed and so that the alarming operation is performed by the alarming means when the gas removing operation is to be performed in the fermenting step of the manual gas removal course, thereby interrupting the fermenting step, said operation control circuit means further controlling the motor and heater in the manual gas removal course so that the interrupted fermenting step is restarted when determining, based on the detecting operation of the detecting means, that the manual gas removing operation has been executed, by the time a predetermined period elapses from the interruption of the fermenting step, thereby sequentially executing the fermenting and baking steps, said operation control circuit means further controlling the motor and heater so that the impeller is rotated for a predetermined short period to execute the gas removing operation when determining, based on the detecting operation of the detecting means, that the manual gas removing operation has not been executed, by the time the predetermined period elapses from the interruption of the fermenting step, thereby executing the remainder of the fermenting step and thereafter the baking step.

* * * * *